April 9, 1957   E. H. BLATTNER   2,788,250
RESILIENT SIDE BEARING

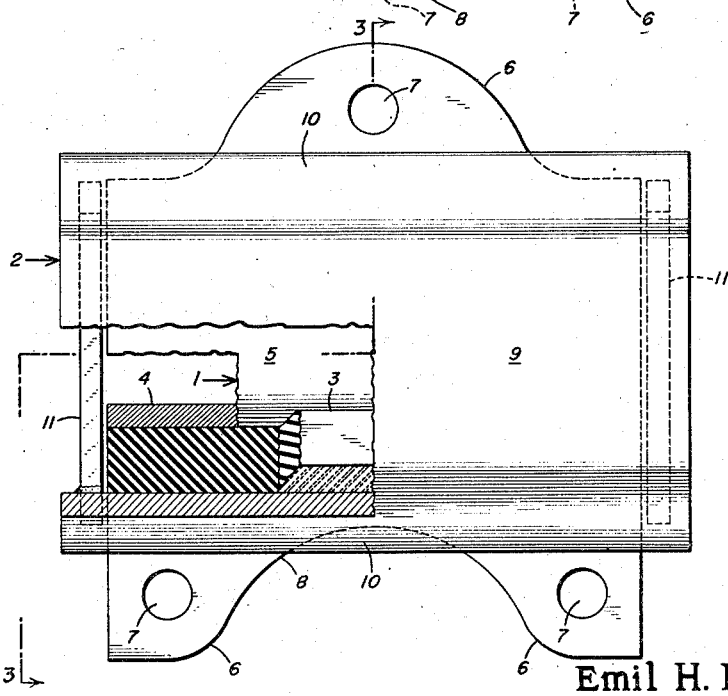
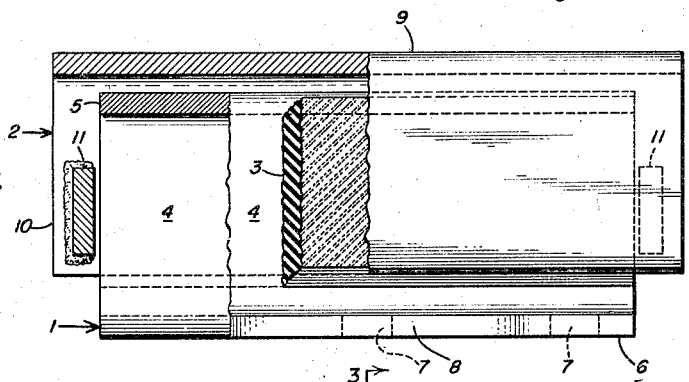
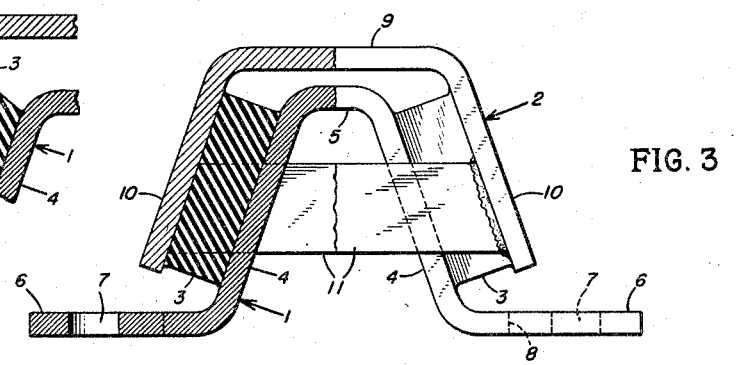
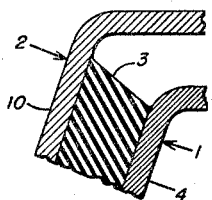

Filed March 11, 1953   3 Sheets-Sheet 2

Inventor:
Emil H. Blattner
By Wilmer Mechlin
his Attorney

April 9, 1957  E. H. BLATTNER  2,788,250
RESILIENT SIDE BEARING
Filed March 11, 1953  3 Sheets-Sheet 3

Inventor:
Emil H. Blattner
By Wilmer Mecklin
his Attorney

United States Patent Office 2,788,250
Patented Apr. 9, 1957

2,788,250

RESILIENT SIDE BEARING

Emil H. Blattner, Williamsville, N. Y., assignor to The Symington-Gould Corporation, Depew, N. Y., a corporation of Maryland Application March 11, 1953, Serial No. 341,757

7 Claims. (Cl. 308—138)

This invention relates to resilient side bearings for railway vehicles.

Side bearings mounted on the trucks and normally spaced from the car body have long been employed to limit the side roll of the bodies of railway vehicles. More recently resilient side bearings have been introduced which maintain constant resilient contact between the body and the trucks and cushion the side roll at its inception, thus minimizing the load applied to the side bearings and preventing truck shimmying or nosing. A difficulty with such resilient side bearings is that they are relatively complex in structure and generally require a built-in snubbing device of some sort to frictionally dampen the periodic oscillations which otherwise could build up in the supporting springs tof the side bearing. An additional difficulty of particular moment in passanger cars is that in the resilient side bearings heretofore employed there is squeaking or noise due to contact between relatively movable metal parts which, because of the constant contact of the side bearing with the car body, is transmitted through the body to the annoyance of the passengers.

It is the primary object of the present invention to provide an improved resilient side bearing which is simple in construction, and by resiliently spacing its body and truck contactings parts entirely by rubber means, is noiseless in operation.

Another object of the invention is to provide a resilient side bearing whereby non-harmonic cushioning of the side roll of a railway car body is obtained without friction snubbing by utilizing rubber means in compression and shear under vertical load as the sole resilient means of the side bearing.

An additional object of the invention is to provide a resilient side bearing having but two main metal parts which may readily be pressed or cast and wherein the sole resilent means are rubber means, the rubber means being constructed and arranged to afford a cushioning action under vertical loads.

A further object of the invention is to provide a resilient side bearing having rubber as its sole resilient means, which is self-adjusting for maintaining full bearing with the contacted part of the car body.

Other objects and advantages of the invention will appear hereinafter in the detailed description, be particularly pointed out in the appended claims, and be illustrated in the accompanying drawings, in which:

Figure 1 is a plan view of a resilient side bearing embodying the invention, with portions broken away and shown in section to more clearly indicate certain of the details of construction;

Figure 2 is a side elevational view of the side bearing of Figure 1, with portions broken away and shown in section to more clearly indicate certain of the details of the invention;

Figure 3 is an end elevational view, partly in vertical section, of the side bearing of Figure 1, the section being taken along lines 3—3 of Figure 1;

Figure 4 is a fragmentary vertical sectional view of the side bearing of Figure 1, showing the side bearing at free height and taken on the same plane as the sectional portion of Figure 3;

Figure 7:
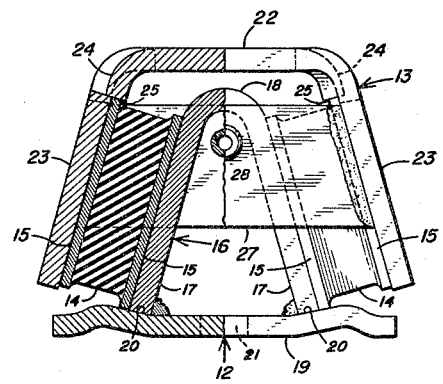
Figure 7 is an end elevational view, partly in vertical section, of the side bearing of Figure 5, the section being taken along lines 7—7 of Figure 5.

Referring now in detail to the drawings in which like reference characters designate like parts, the resilient side bearing of the present invention is comprised of a pair of interfitting metal members having inclined opposed walls between which are interposed rubber means for resiliently spacing or separating the members. Of the two members, one is adapted to be mounted on a truck bolster 30 or other part of a railway truck 31 and the other to bear against the underside of a body bolster 32 or other part of a vehicle body 33, with the rubber units in both compression and shear under vertical load so as to yieldably resist side rolling of the vehicle body and prevent the building up of periodic oscillations by their absorption of energy.

While the two main metal mmebers of the side bearing may conveniently be cast or similarly made, both of the illustrated forms of the side bearing utilize members which are stamped or pressed from plates. Referring first to the embodiment of Figures 1–4, the side bearing there illustrated has as its main metal members a base or base member 1 and a cap member, cap or shoe 2, interfitting with the base member, the cap member being supported above and held to the base member by a pair of laterally spaced rubber units in the form of rubber blocks or pads 3. The base member 1 is arched intermediate its sides and has a pair of laterally spaced upslanting or upwardly inclined, sloping or converging side walls, walls or legs 4, the walls being substantially flat or planar and connected or joined at their upper extremities or ends by a substantially horizontally disposed or directed web 5.

At their lower extremities the legs 4 may be connected, as to a separate base (not shown), but preferably terminate in laterally projecting substantially horizontally disposed or directed flanges or feet 6 through which the base member may be mounted on or anchored to the supporting railway truck 32. By so anchoring the base member, spreading of the legs 4 under load is prevented, without cross-bracing. The feet 6 may be anchored by any suitable connections and, if to be bolted or riveted, are conveniently provided with apertures 7. Where, as here, a three-point connection is to be employed, the single apertured foot may be of the same configuration as a central recess 8 in the foot having the other two apertures, to conserve metal in stamping.

The cap member, cap or shoe 2 is arched or concavely pocketed to fit over, straddle or receive the central arch or upstanding portion of the base member 1, and has a central web or bearing plate 9 from the sides of which depend a pair of laterally spaced downslanting or downwardly inclined, sloping or diverging side walls, walls or legs 10. Each of these side walls is substantially flat or planar and opposes or confronts a corresponding of the side walls 4 of the base member 1. The side walls of each opposed pair are, preferably, substantially parallel with those of the cap member horizontally or laterally spaced outwardly and confining the side walls of the base member. The side walls 10, in depth, terminates sufficiently short of the feet 6 of the base member to be held thereabove, first by the rubber units 3 and, if the side bearing is forced solid, then by contact between the bearing plate 9 of the cap member and the central web or stop 5 of the base member.

To prevent the legs 10 of the cap member from spreading under load, they are cross-braced adjacent either longitudinal end of the cap member, the cross-bracing for the illustrated stamped cap member being provided by cross-ties, straps or end plates 11, connecting and welded at their ends to the legs. As shown, the cap member overhangs the base member at either longitudinal end sufficiently to enable the cross-ties 11 to be spaced from the ends of the base member under normal operating conditions, the spacing being such that the cross-braces serve to limit the extent of longitudinal shifting of the cap member by limiting the end bulging of the rubber blocks 3.

In this embodiment of the invention the rubber units are interposed between each of the opposed pairs of the side walls 4 and 10, and locked, held or fixed in place by bonding them directly to the side walls. Such bonding not only positions the rubber units but enables them to serve as the sole connection between the cap and base members and hold the latter in assembled relation both before and after installation.

Figure 6:
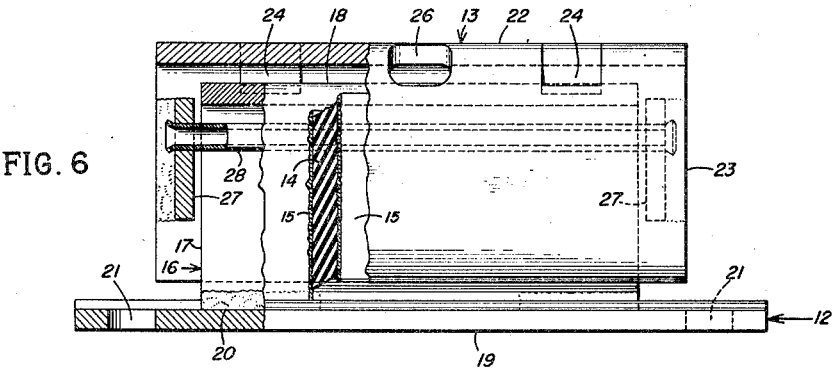
Figure 6 is a side elevational view of the side bearing of Figure 5, with portions broken away and shown in section to more clearly indicate certain of the details of the invention.
Figure 5:
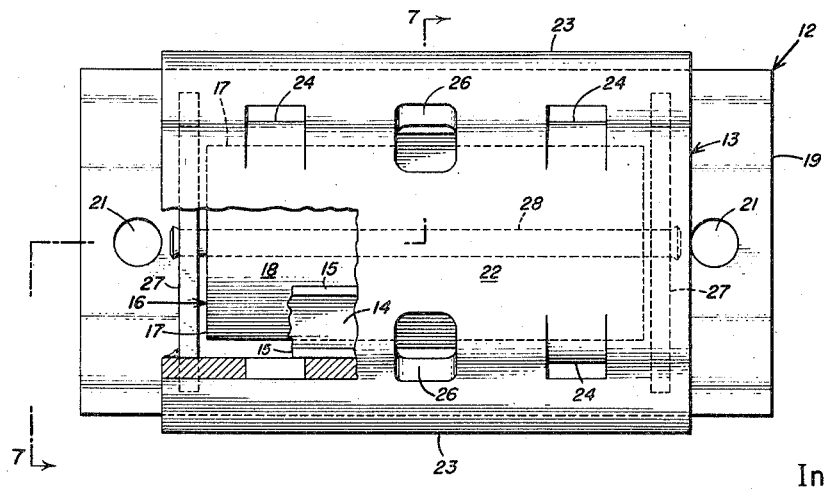
Figure 5 is a plan view of a second embodiment of the resilient side bearing of the invention, with portions broken away and shown in section to more clearly indicate certain of the details of construction.
Figure 8:
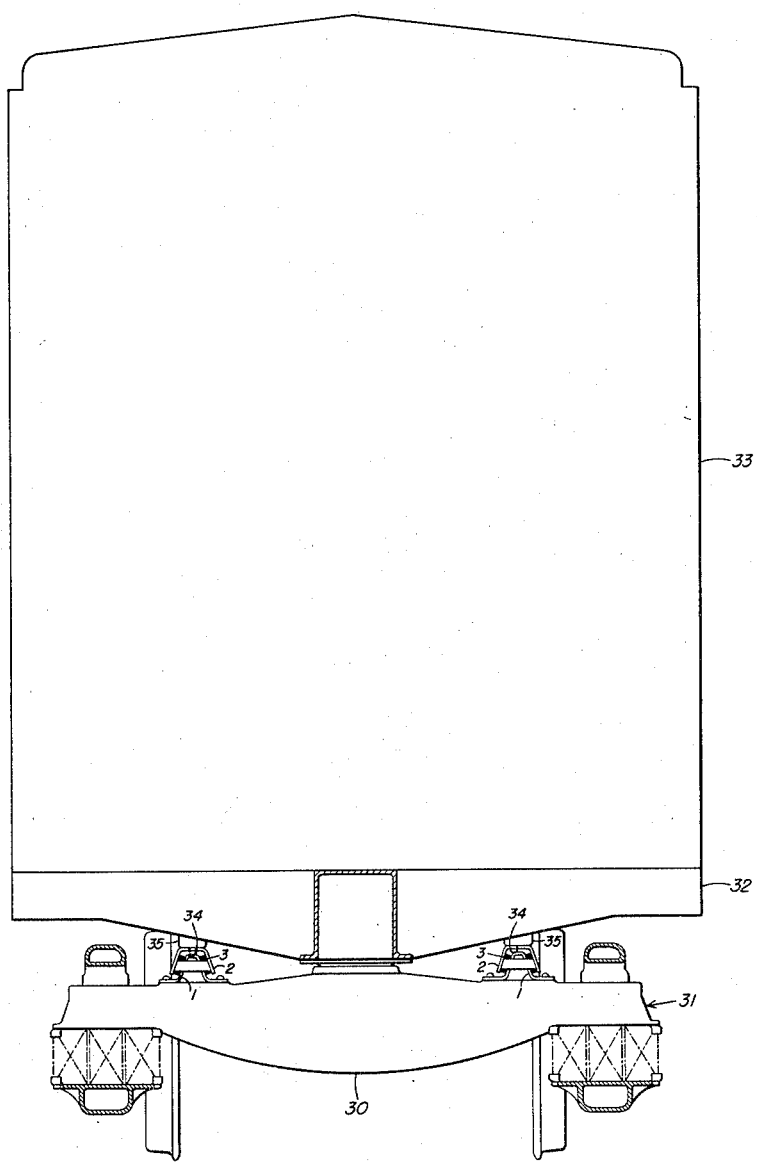
Figure 8 is a somewhat diagrammatic transverse sectional view of a conventional railway vehicle illustrating a typical installation of a pair of the side bearings of the present invention between the body and truck bolsters.

The second embodiment of the invention, illustrated in Figures 5-7, differs from the first in several respects. Its base member 12 and cap member 13 are resiliently separated or spaced by rubber blocks or pads 14. However, the opposed walls on the base and cap member between which the rubber blocks are interposed are here furnished by side plates 15, removably fixed to the members, the rubber blocks being sandwiched between and directly bonded to the side plates. The rubber blocks and their sandwiching plates are designed to provide rubber units which may be removed, if necessary, for replacement. The structure by which the side bearing of the second embodiment accommodates removable rubber units, as well as its other features, will now be described.

In this embodiment, the base member 12 is formed of an upright or arched member 16 of substantially inverted V-shape, the side walls, or legs 17 of which slope or slant upwardly and converge toward an integral arched or rounded web or stop 18 connecting or joining their upper ends. The side walls are substantially flat or planar and at their laterally spaced lower extremities are connected and braced by a base plate or base 19 to which they are welded. Substantially flat over its portion intermediate the legs, the base plate 19 is bowed or humped upwardly inwardly of either lateral end to provide, under and for a short distance beyond each of the legs 17, a shoulder or abutment 20 disposed substantially normal to the adjacent leg. With its sloping side walls 17 braced against lateral spreading by its base plate 19, the base member 12 may be anchored to the railway truck 31 on which it is mounted by suitable connections. In the form shown it is particularly designed for a 2-bolt or rivet connection (not shown), the base plate 19 for this purpose extending longitudinally, as well as laterally, beyond the upright 16 and having an aperture 21 adjacent either longitudinal end.

The cap member, cap or shoe 13 overfitting, straddling or pocketing the inverted V-shaped upright 16 of the base member 12 has a central web or bearing plate 22, from the opposite sides of which depend a pair of laterally spaced downslanting or downwardly sloping and diverging side walls, walls or legs 23. These side walls are substantially flat or planar and, like those of the first embodiment, each opposes or confronts and preferably is disposed substantially parallel to a corresponding of the side walls 17 of the base member 12. The side walls 23 end above the base plate 19 and are held thereabove normally by the rubber units 14 and, if the side bearing is driven solid, by contact of the bearing plate 22 with the stop 18 forming the rounded upper end of the upright 16.

The shoulders 20, with the side walls 17 of the base member, serve as seats for the inner of the side plates 15 of the rubber units 14. A like functions is performed on the cap member for the outer of the side plates 15 by tabs 24 which may be stamped or punched in the cap member either as a separate operation or as the latter is stamped, and provide downwardly facing shoulders or abutments 25, projecting inwardly of and disposed substantially normal to the legs 23. Four such tabs are employed in the illustrated embodiment, two on either side and each positioned adjacent one of the longitudinal ends of the cap member.

Maintained under load or pressure in the installed condition of the side bearing, the rubber blocks 14 apply both lateral and vertical forces to the side plates 15, pressing the latter against the corresponding of the opposed side walls 17 and 23. At the same time they press or urge the lower ends of the inner side plates and the upper ends of the outer side plates against the shoulders 20 and 25, respectively, on the base and cap members. So urged, each of the side plates is locked or fixed to the corresponding opposed side wall on which it seats or bears and held against vertical displacement relative thereto. The side plates thus effectively serve as the opposed walls of the base and cap members, through bonding to which the rubber blocks are placed in shear under vertical load.

Between the tabs 24 and substantially on the same vertical level, will be seen oval openings 26, which extend through the cap member at the juncture of the cover plate 22 with the legs 23. The openings are provided for ready checking from the side of the car of the clearance between the cap and base members to determine the condition of the side bearing.

Joining the legs 23 toward either longitudinal end of the cap member and beyond the corresponding ends of the upright 16 of the base member are cross-braces or ties or end or stiffening plates 27 welded to the inner faces of the legs. Like the stiffening plates 11 of the first embodiment, the plates 27 of this embodiment are spaced from the ends of the upright 16 of the base member 12 to move clear of the latter under load, and at the same time aid in cushioning relative longitudinal movement of the cap member by limiting the extent of end bulging of the rubber blocks 14. The stiffening plates 27 also provide convenient mountings for the ends of a retaining pin or rod 28 by which the side bearing of this embodiment is held in assembled relation when not installed. As shown, this pin may extend longitudinally through the upright 16 at sufficient spacing below the stop or nose-piece 18 to move free of the upright until the rubber reaches substantially its free height.

Whether bonded directly to the cap and base members, as in the first embodiment, or bonded to side plates forming the opposed walls of the members, as in the second embodiment, the rubber units or blocks 3 and 14 are designed to be of greater free than installed height so as to be compressed under operating conditions and constantly urge the cap member against the contacted part of the car body and thus maintain the constant resilient contact necessary for minimizing side roll of the body. To illustrate this difference, the side bearing of the first embodiment, with the rubber at free height, is fragmentally shown in Figure 4.

Requiring loading to enable it to act against the underside of the car body 33 with sufficient force to prevent car body nosing and truck shimmy, the ideal side bearing would maintain this loading constant over its full range of travel under operating conditions. This ideal condition is closely approached in the side bearing of the present invention by the arrangement of the rubber blocks and the cap and base members by which the rubber under vertical load is in shear, and after its initial compression on installation and varies but slightly in compression over the range of travel of the side bearing, once the latter has been compressed to the extent necessary for installation. The shear is obtained by locking the rubber blocks to the opposed walls between which they are interposed, and the small variation in compression is the result of the relatively slight angularity of inclination of the rubber blocks with the vertical, coupled with the preferred parallel disposition, of the opposed walls on the base and cap members. In the illustrated embodiments this angle of inclination with the vertical of both the walls and the blocks is about 20 degrees. This angle will vary with the hardness of the rubber used and the loading necessary for the type of car on which the side bearing is installed, the loading characteristics of rubber of a given hardness and at a given angle of inclination being readily obtainable from available tables. The rubber blocks in shear and compression not only provide the necessary travel with a minimum variation in loading, but absorb energy under load, preventing the building up of oscillations such as are obtained with coil springs and providing non-harmonic cushioning of body side roll.

It will be noted that the rubber blocks of both embodiments are relatively long and wide, the dimensions of the blocks at free height being approximately 9" x 3" x 1". Since the load is distributed over the full length of the blocks and acts through their width, the side bearings both give adequate support and are soft acting under vertical load. The size of the blocks, in turn, affords a soft cushion against longitudinal displacement of the cap member, the rubber again being in shear and compression, the latter after the rubber blocks have bulged against the end plates connecting the legs of the cap member. Against transverse displacement the side bearings are relatively stiff acting as the blocks are then mainly under compression. However, since the side bearings are designed for installation with their longitudinal dimension disposed transversely of the truck bolster 30 on which they would normally be mounted, and there is but negligible transverse movement of the bolster relative to the car body 33, the side bearings are soft acting in resisting the movements to which they will normally be subjected in operation; nosing of the car body and swinging of the body relative to its trucks.

A further feature of each side bearing is an incident of the lateral spacing of the supporting rubber blocks. This enables the bearing plate of the cap member automatically to accommodate or adjust to any angular tipping of the surface on which the side bearing is supported relative to the undersurface 34 of a rigid bearing member 35 on the car body which the bearing plate contacts, thus enabling full bearing with the car body to be maintained at all times.

Since the rubber blocks are compressed at all times, when installed, and so maintain contact with the car body of the cap member in both embodiments of the invention, the resultant wear on the bearing plates 9 and 22, particularly as the car body swings relative to its trucks in rounding curves, would shorten the life of the cap member unless provision were made to prevent it. This may be accomplished in both embodiments by flame hardening or carburizing the upper face of the cover plate or, if preferred, a wear-resistant material, such as a brake or shoe lining, may be bonded or otherwise attached to the cover plate to serve as its friction surface.

From the above detailed description it will be apparent that there has been provided an improved resilient side bearing which is relatively simple in construction, inexpensive to manufacture, noiseless and trouble-free in operation, and of long life. It should be understood that the described and disclosed embodiments are merely exemplary of the invention and that all modifications are intended to be included which do not depart either from the spirit of the invention or the scope of the appended claims.

Having described my invention, I claim:

1. The combination, with a railway truck and a car body, of a resilient side bearing interposed therebetween, said side bearing comprising a base member mountable on said truck and having substantially planar walls upslanting therefrom, a cap member spaced from said base member for limited vertical and horizontal movement relative thereto, said cap member having a bearing plate constantly urgeable against an underside of said car body and substantially planar walls downslanting therefrom and opposing said upslanting walls, and rubber means interposed only between said opposing walls and spacing said base and cap members for yieldably resisting said relative movement therebetween, said side bearing on mounting of said base member on said truck being disposed with said walls extending substantially longitudinally of said car body, whereby the resistance of said side bearing is greater to transverse than to swinging movement of said car body relative to said truck.

2. The combination, with a railway truck and a car body, of a resilient side bearing interposed therebetween, said side bearing comprising a base member mountable on said truck and having substantially planar walls upstanding therefrom, a cap member spaced from said base member for limited vertical and horizontal movement relative thereto, said cap member having a bearing plate constantly urgeable against an underside of said car body and substantially planar walls downstanding therefrom and opposing said upstanding walls, and rubber means interposed only between said opposing walls and spacing said base and cap members for yieldably resisting said relative movement therebetween, said side bearing on mounting of said base member on said truck being disposed with said walls extending substantially longitudinally of said car body, whereby the resistance of said side bearing is greater to transverse than to swinging movement of said car body relative to said truck.

3. The combination, with a railway truck and a car body, of a resilient side bearing interposed therebetween for resisting relative movement thereof, said side bearing comprising a base member mountable on said truck and having substantially planar side walls upslanting therefrom, a cap member spaced from said base member for limited vertical and horizontal movement relative thereto, said cap member having a bearing plate constantly urgeable against an underside of said car body and substantially planar side walls downslanting therefrom and opposing said upslanting side walls, and rubber means interposed only between said opposing side walls and spacing said base and cap members for yieldably resisting said relative movement therebetween, said side bearing on mounting of said base member on said truck being disposed with said walls extending substantially longitudinally of said car body, whereby the resistance of said side bearing is greater to transverse than to swinging movement of said card body relative to said struck.

4. The combination, with a railway truck and a car body, of a resilient side bearing interposed therebetween, said side bearing comprising a base member mountable on said truck, a cap member spaced for limited horizontal and vertical movement relative to said base member and having a bearing plate constantly urgeable against an underside of said car body, transversely spaced planar side walls on one of said members and extending toward said other member, side walls on said other member extending toward said one member and opposing and spaced from said first named walls, and rubber means interposed only between said opposing walls and spacing said base and cap members for yieldably resisting said relative movement therebetween, said side bearing on mounting of said base member on said truck being disposed with said walls extending substantially longitudinally of said car body, whereby the resistance of said side bearing is greater to transverse than to swinging movement of said car body relative to said truck.

5. The combination, with a railway truck and a car body, of a resilient side bearing interposed therebetween, said side bearing comprising a base member mountable on said truck and having substantially planar walls upstanding therefrom, a cap member spaced from said base member for horizontal and vertical movement relative thereto, said cap member having a bearing plate constantly urgeable against an underside of said car body and substantially planar walls downstanding therefrom and opposing said upstanding walls, means on said members for limiting said relative movement therebetween, and rubber means interposed only between said opposing walls and spacing said base and cap members for yieldably resisting said relative movement therebetween, said side bearing on mounting of said base member on said truck being disposed with said walls extending substantially longitudinally of said car body, whereby the resistance of said side bearing is greater to transverse than to swinging movement of said car body relative to said truck.

6. The combination, with a railway truck and a car body, of a resilient side bearing interposed therebetween, said side bearing comprising a base member mountable on said truck, a cap member spaced for limited horizontal and vertical movement relative to said base member and having a bearing plate constantly urgeable against an underside of said car body, planar walls on one of said members and diverging toward said other member, planar walls on said other member and converging toward said one member and opposing and spaced from said first named walls, and rubber means interposed only between said opposing walls and spacing said base and cap members for yieldably resisting said relative movement therebetween, said side bearing on mounting of said base member on said truck being disposed with said walls extending substantially longitudinally of said car body, whereby the resistance of said side bearing is greater to transverse than to swinging movement of said car body relative to said truck.

7. The combination, with a railway truck and a car body, of a resilient side bearing interposed therebetween, said side bearing comprising a base member mountable on said truck and having substantially planar walls upstanding therefrom, a cap member spaced from said base member for limited vertical and horizontal movement relative thereto, said cap member having a bearing plate constantly urgeable against an underside of said car body and substantially planar walls downstanding therefrom and opposing and substantially parallel to said upstanding walls, and means consisting of rubber interposed only between and held against vertical movement relative to said opposing walls for yieldably resisting said relative movement of said base and cap members, whereby the resistance of said side bearing is greater to transverse than to swinging movement of said car body relative to said truck.

References Cited in the file of this patent

UNITED STATES PATENTS

| | | |
|---|---|---|
| 799,316 | Edwards | Sept. 12, 1905 |
| 1,761,815 | Busch | June 3, 1930 |
| 2,211,463 | Hobson | Aug. 13, 1940 |
| 2,259,049 | Swan | Oct. 14, 1941 |
| 2,509,955 | Barnes | May 30, 1950 |
| 2,599,469 | Merry | June 3, 1952 |

FOREIGN PATENTS

| | | |
|---|---|---|
| 448,079 | Italy | May 6, 1949 |